United States Patent [19]

Maynard

[11] 3,768,124

[45] Oct. 30, 1973

[54] NAIL PACKAGE IMPROVEMENTS FOR INTERCONNECTING THE TRAILING NAIL OF ONE NAIL PACKAGE WITH THE LEADING NAIL OF ANOTHER NAIL PACKAGE

[75] Inventor: George A. Maynard, Coventry, R.I.

[73] Assignee: Textron, Inc., Providence, R.I.

[22] Filed: Jan. 13, 1972

[21] Appl. No.: 217,461

[52] U.S. Cl. .......................... 24/81 CC, 206/56 DF
[51] Int. Cl. ....................... A44b 21/00, B65d 83/02
[58] Field of Search ..................... 24/81 CC, 73 HH, 24/73 CC; 206/65 B, 56 DF

[56] References Cited
UNITED STATES PATENTS

| 1,157,917 | 10/1915 | Allen | 24/73 HH |
| 2,954,602 | 10/1960 | Derby | 206/56 AB UX |
| 3,083,369 | 4/1963 | Peterson | 206/56 DF |
| 3,442,374 | 5/1969 | Hillier | 206/56 DF |
| 3,486,531 | 12/1969 | Nalodka | 24/81 CC |

FOREIGN PATENTS OR APPLICATIONS 1,132,732 11/1968 Great Britain .................. 24/81 CC Primary Examiner—Donald A. Griffin
Attorney—John W. Malley et al.

[57] ABSTRACT

A device for use in connecting the trailing nail of a first group of nails interconnected in series in parallel relation by flexible elongated wires or the like secured across the shanks thereof with the leading nail of a second group of nails similarly interconnected comprising a one-piece element made of thin resilient material shaped to provide spaced trailing and leading nail shank engaging portions integrally interconnected by a central connecting portion, each of the nail shank engaging portions are of generally C-shaped configuration and operable to resiliently grip a nail shank around a substantial portion of the periphery thereof in response to a relative transverse movement of a nail from a disengaged position outwardly thereof to an engaged position therein, each of the nail shank engaging portions define an opening of a size less than the diameter of the nail shank when the latter is in a disengaged or engaged position with respect thereto and is sufficiently resilient to flex outwardly in response to the movement of a nail from the disengaged position to the engaged position to expand the opening to the shank diameter size and permit passage of the nail thereby, the connecting portion has a longitudinal extent such that when the aforesaid trailing and leading nails are disposed in engaged positions within the trailing and leading nail shank engaging portions respectively the trailing and leading nails are spaced apart a distance equal to their spacing with respect to the adjacent nail of their respective groups and is constructed to transmit transverse feeding movements of the trailing nail to the leading nail and to provide for the fracture and separation of the trailing nail shank engaging portion from the leading nail shank engaging portion in response to a rapid relative longitudinal movement of the trailing nail with respect to the leading nail.

6 Claims, 6 Drawing Figures

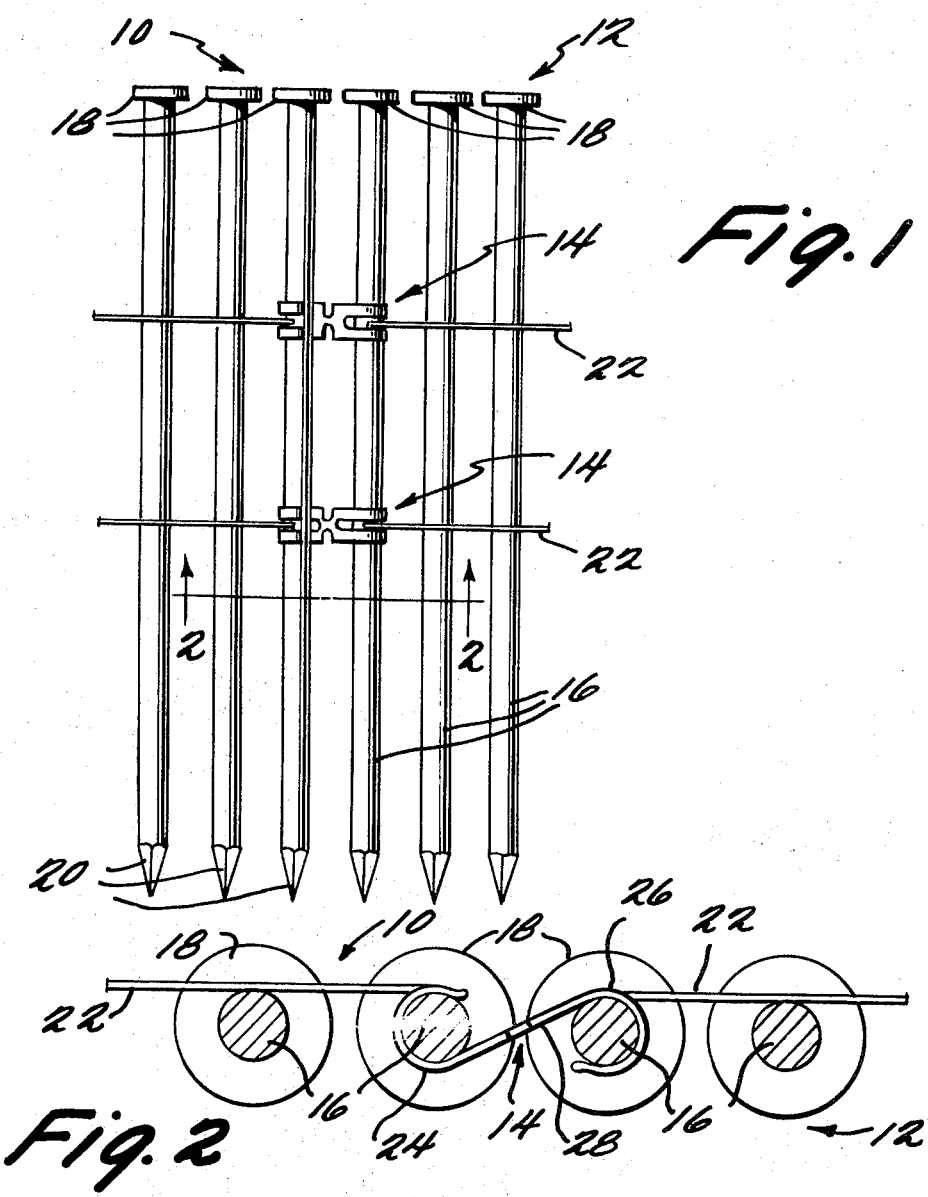
Fig. 1
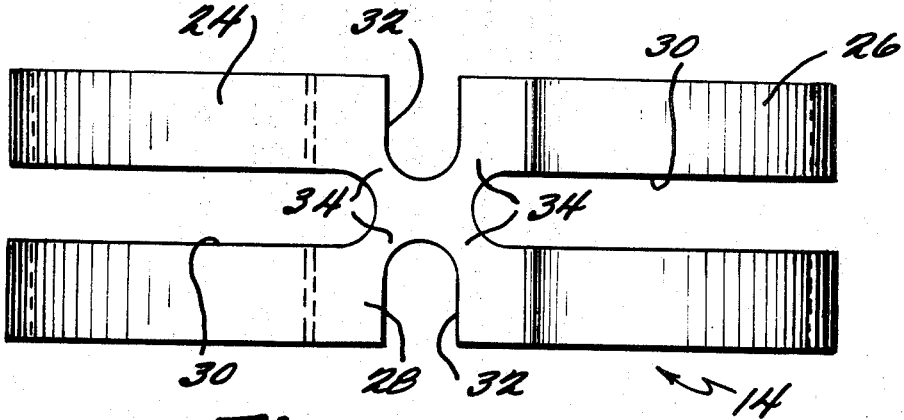
Fig. 2
Fig. 3

NAIL PACKAGE IMPROVEMENTS FOR INTERCONNECTING THE TRAILING NAIL OF ONE NAIL PACKAGE WITH THE LEADING NAIL OF ANOTHER NAIL PACKAGE

This invention relates to nail packages for use in power operated nail driving devices and more particularly to improvements in nail packages of the type including a multiplicity of nails interconnected in series in parallel relation by elongated flexible means rendering such nail packages capable of being interconnected to facilitate use thereof during operation.

The present invention is particularly useful in conjunction with high capacity pneumatically activated nail driving devices of the production machine type such as disclosed in my co-pending U.S. Pat. application Ser. No. 167,414 filed July 29, 1971. This application discloses a production type nail driving device for successively driving nails in a substantially large packaged condition as, for example, nails of the order of 3,000 or the like interconnected by a pair of flexible wires welded in parallel relation across the shanks of the nails with the nails in substantial parallel relation in accordance with the teachings of commonly-assigned Peterson U.S. Pat. No. 3,083,369. In accordance with the disclosure of my aforesaid co-pending application, the package of nails may be separately supported in packaged coiled relation with a leading portion of the package extending from the coil in row formation into cooperating relation with the nail feeding mechanism of the nail driving device. Once the leading portion of the nail package has been positioned in operative relation with the device, the latter may be operated to effect successive driving movements of successive nails in the package. Notwithstanding the relatively large number of nails which can be handled in one package, nevertheless, due to the high operating capacity of the device the frequency with which the device must be loaded with a new nail package during operation causes considerable inconvenience. To a considerable extent, the inconvenience caused by reloading is occasioned by the necessity to open up the nail feeding mechanism of the device, to place the leading portion of the new nail package in proper operative position with respect to the opened nail feeding mechanism and then to close the mechanism with the leading portion of the nail package properly disposed therein Accordingly, it is an object of the present invention to provide improvements in conventional nail packages rendering them operable in such a way as to materially eliminate the inconveniences heretofore experienced in loading individual nail packages in the nail driving device.

In accordance with the principles of the present invention, this object is obtained by providing connecting elements which can be easily engaged between the trailing nail of a nail package being fed through the nail driving device and the leading nail of a new nail package. The connecting elements serve to interconnect the trailing and leading nails of the two nail packages in a relationship the same as the relationship of any two nails in either package, thus insuring that the leading portion of the new nail package can be moved into operative position within the nail driving device by the connector elements, which transmit such movement from the nail package being driven. In this way, the necessity to open and close the nail feeding mechanism of the nail driving device is eliminated and it is no longer necessary to manually position the leading portion of the new nail package in operative position with the nail driving device, since the latter is automatically moved therein by continued operation of the device and the motion transmitting function of the connecting elements.

A further object of the present invention is the provision of connecting elements of the type described which are operable to transmit transverse feeding movements of a trailing nail of one nail package to the leading nail of a new nail package and which will fracture in response to a relative longitudinal movement of the trailing nail engaged thereby with respect to the leading nail engaged thereby so as to permit separation and driving movement in the usual way.

Still another object of the present invention is the provision of a connector element of the type described which is simple in construction, effective in operation and economical to manufacture.

These and other objects of the present invention will become more apparent during the course of the following detailed description and appended claims.

The invention may best be understood with reference to the accompanying drawings wherein illustrative embodiments are shown.

In the drawings:

FIG. 1 is a fragmentary side elevational view illustrating the trailing end portion of a nail package being fed through a pneumatically actuated nail driving device with the improvements embodying the principles of the present invention operatively engaged therewith and with the leading portion of a new, similar nail package;

FIG. 2 is an enlarged fragmentary sectional view taken along the line 2—2 of FIG. 1;

FIG. 3 is an enlarged side elevational view of a preferred embodiment of a connector element embodying the principles of the present invention;

Figure 4:
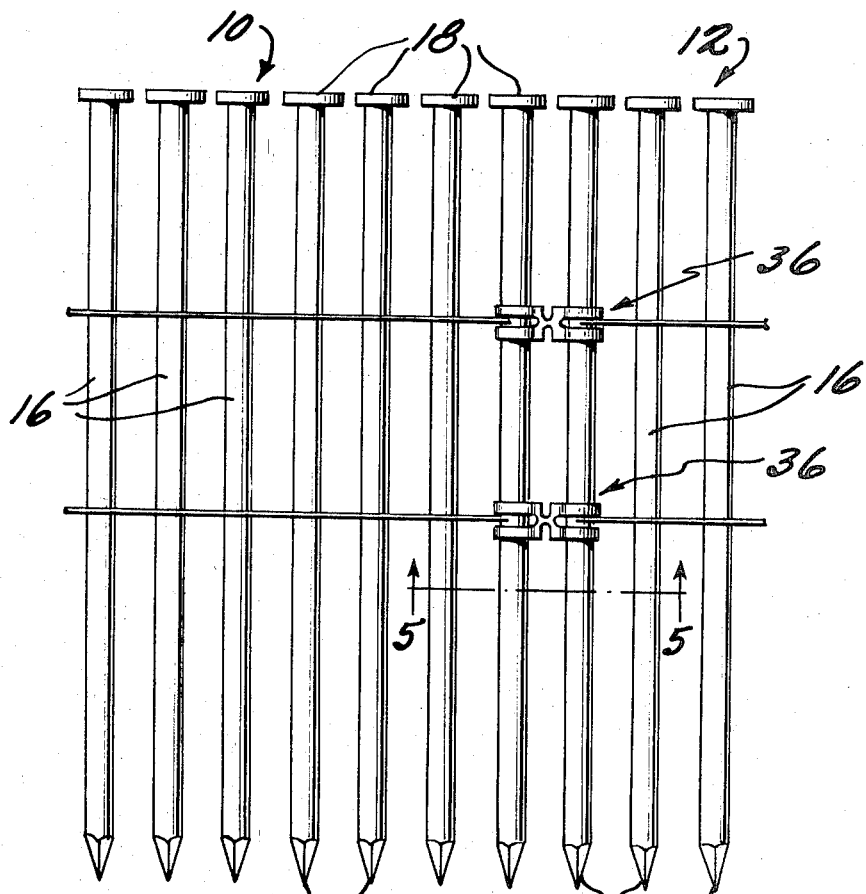
FIG. 4 is a view similar to FIG. 1 illustrating a modified form of the invention.

Referring now more particularly to FIG. 1 of the drawings, the improvements embodying the principles of the present invention are illustrated therein in operative assembled relation, the assembly including a first nail package, the trailing end portion of which is indicated at 10 in FIG. 1, a second nail package the leading portion of which is indicated at 12 in FIG. 1, and a pair of connector elements or members each generally indicated at 14 in FIG. 1. The particular nail packages 10 and 12 illustrated are constructed in accordance with the teachings of the aforesaid Peterson U.S. Pat. No. 3,083,369. The package includes a multiplicity of nails each having a shank 16, a round head 18 integrally formed on one end thereof and a point 20 formed on the other. The nails of each package are interconnected in series in generally parallel relation with respect to each other by flexible elongated means extending across and secured to the shanks 16. In the preferred embodiment shown which is constructed in accordance with the aforesaid Peterson patent, the elongated means is in the form of a pair of flexible wires 22 extending in parallel relation across the shanks 16 along one side thereof and secured thereto as by welding. As indicated in the specification of the aforesaid Peterson patent, the nails thus flexibly secured together in series are disposed within a coiled configuration for packaging and use in conjunction with a nail driving device such as disclosed in my aforesaid co-pending application. As indicated in the specification of the co-pending application, a package 10 or 12 may include as many as 3,000 nails in a single package in coil formation. In use, the coiled package is mounted for rotation on a spindle and the leading portion of the package is pulled outwardly and disposed in operative position within the nail feeding mechanism of the nail driving device. As the device is operated, the leading portion of the nail package with the nails thereof in row formation, are incrementally fed in the direction of the row formation so that successive leading nails can be stripped from the remaining nails of the package and driven into the workpiece. As the leading portion of the package advances through the nail feeding mechanism, the trailing coiled portion of the package mounted on the spindle is turned about the axis of the spindle so that the trailing end portion is progressively moved to the leading end portion during operation.

In accordance with the principles of the present invention, when the operation has proceeded to the point that there are but a few coils of nails left on the spindle, these coils are removed from the spindle and a new nail package 12 is mounted thereon. The connector elements 14 serve to effectively interconnect the nail packages so that upon continued operation of the nail driving device, the connector elements will serve to move the new nail package 12 into operative relation with the nail feeding mechanism of the nail driving device without the necessity of opening and closing the same.

In the preferred embodiment shown in FIGS. 1 and 2, wherein the nail packages are of the parallel welded wire type, the connector elements 14 are adapted to engage the shank of the trailing nail of the nail package 10 and the shank of the leading nail of the package 12. It will be understood that the principles of the present invention have applicability to other types of nail packages such as those embodying flexible plastic strips adhesively secured to the nail shanks, flexible plastic carrier strips having flexible fingers detachably receiving the nails in generally parallel relation and the like. The present invention contemplates in its broadest aspects, improvements in which one or more connector elements serve to interconnect the plastic carrier strips so that the leading and trailing nails of two respective packages are in proper orientation with respect to each other, although it will be understood that the preferred nail shank engaging connector elements may be used in any of these packages.

Referring now more particularly to FIG. 3, the preferred form of connector element 14 is illustrated therein. In general, the connector element 14 includes a trailing nail shank engaging portion, indicated at 24, a leading nail shank engaging portion indicated at 26 and an integral connecting portion indicated at 28. In the preferred embodiment illustrated in FIG. 3, the connector element 14 is constructed of a one-piece member preferably in the form of spring steel. It will be understood that other materials may be utilized, as for example molded plastic or the like. Each nail shank engaging portion is generally of C-shaped configuration, as best shown in FIG. 2, and is formed with a central slot or opening 30 extending inwardly from the free end into the connecting portion 28 dividing the respective nail shank engaging portion into a pair of spring fingers. The connecting portion 28 is formed with a pair of opposed slots 32 extending inwardly from opposite edges thereof in perpendicular relation to the slots 30. The arrangement of the slots 30 and 32 defines relatively narrow fracturable neck portions 34 interconnecting each spring finger of the associated shank engaging portion within the connecting portion 28.

With reference to FIG. 2, it will be noted that the C-shaped configuration of each nail shank engaging portion is arcuate about a single center and includes an outwardly curved free end and an opposite end portion which is integrally joined with the connecting portion. In the embodiment shown in FIG. 2, the trailing nail shank engaging portion 24 is reversed with respect to the leading nail shank engaging portion 26 so that the nail shank receiving openings are in opposed relation with one another with the connecting portion 28 extending diagonally therebetween. It will be noted that the openings between the free end and opposite end of each C-shaped nail shank engaging portion is of a dimension less than the diameter of the nail shank 16, the spring fingers being sufficiently resilient to flex outwardly in response to the transverse movement of a nail shank from a disengaged position outwardly of the opening transversely into an engaged position within the opening to expand the opening to the diameter size of the nail and permit passage of the nail shank thereby. It will also be noted that the connecting portion has a longitudinal extent such that when the trailing and leading nails are gripped in engaged positions within the trailing and leading nail shank engaging portions respectively, the trailing and leading nails are spaced apart a distance equal to their spacing with respect to the adjacent nail of their respective groups.

The slots 30 permit the connector elements 14 to be positioned longitudinally on the nail shanks 16 at predetermined positions thereon, namely with the flexible wires 22 extending through the slots 30. With this positioning, the connector elements when moved through the feeding mechanism of the nail driving device will be accommodated by the spaces which normally are provided for accommodating the connector wires 22. The trailing nail shank engaging portion 24 includes a section which extends across the leading surface of the trailing nail shank and that the leading nail shank engaging portion 26 includes a like section which extends across the trailing surface of the leading nail shank of the nail package 12. With this arrangement, feeding movements transmitted to the trailing nail of the nail package 10 through the wires 22 will be transmitted to the leading nail of the nail package by the connector elements 14 in a manner minimizing the tendency for the spring fingers to flex into an open position and release the nail shanks. When it is considered that a new nail package, such as the package 12, may contain as many as 3,000 nails it can be appreciated that the connector elements must have the capability to transmit substantial feeding movement forces.

On the other hand, the connector elements, once they have performed their primary function of moving the new nail package into operative position within the nail driving device, must also be operable to fracture to permit separation and driving movement of the trailing nail of the package 10. The neck portions 34 facilitate this fracturing action which occurs when the trailing nail of the package 10 is moved rapidly in a longitudinal direction with respect to the leading nail of the package 12 during the normal operation of the nail driving device. In this regard, it will be noted that the two spring fingers of the nail shank engaging portion 24 are in gripping engagement with the shank of the trailing nail of the nail package 10 as this rapid longitudinal movement takes place. Likewise, the spring fingers of the leading nail engaging portion 26 are in gripping engagement with the shank of the leading nail of the nail package 12 which is held stationary during the rapid longitudinal movement of the trailing nail of the nail package 10. The result of the two gripping actions is to effect a bending and fracture of the neck portions 34 associated with the spring fingers of the trailing nail shank engaging portion 24. While it is contemplated that the gripping action of the spring fingers after fracture is sufficient to retain them on their respective nail shanks until the latter are actually driven into a workpiece, at which time they are stripped from the shanks, it will be understood that this desired action can not always be achieved in operation. Nevertheless, the size of the spring fingers is such as to prevent no real problem if stripped off within the drive track of the nail driving device.

Figure 5:
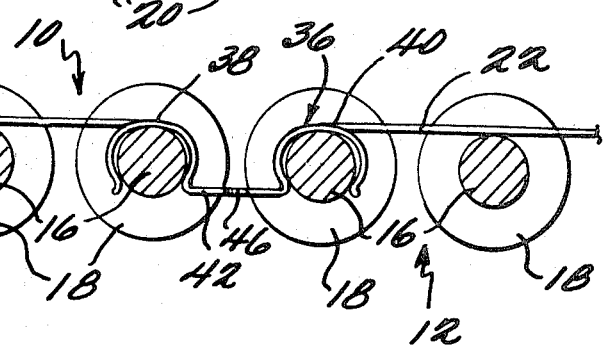
FIG. 5 is an enlarged fragmentary sectional view taken along the line 5—5 of FIG. 4.
Figure 6:
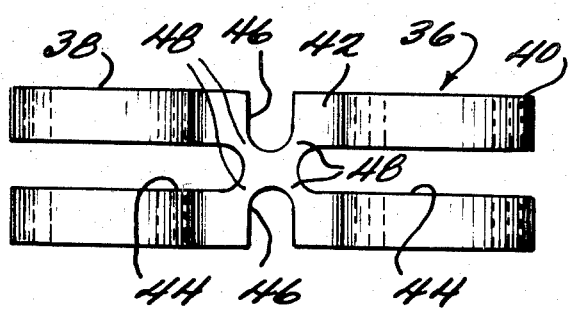
FIG. 6 is a side elevational view of a connector element of modified form embodying the principles of the present invention.

Referring now more particularly to FIGS. 4-6, there is shown therein another embodiment of the present invention which illustrates certain variables in the construction of the connector elements 14 previously described. FIG. 4 is similar to FIG. 1 and illustrates two nail packages 10 and 12 of the type previously described. As before, the trailing nail of the nail package 10 and leading nail of the nail package 12 are interconnected by a pair of connector elements of modified construction, indicated generally at 36. As before, each connector element 36 includes a trailing nail shank engaging portion 38, a leading nail shank engaging portion 40, and a connecting portion 42 formed integrally therebetween. As before, each nail shank engaging portion is of generally C-shaped configuration. However, as best shown in FIG. 5, the C-shaped configuration is oblong rather than being arcuate about a common center. The orientation of the C-shaped nail shank engaging portions is generally the same rather than being reversed as previously described. In this way, the openings face laterally in the same direction and the connection portion 42 extends longitudinally between the two nail shank engaging portions along the side of the openings. Each nail shank engaging portion is provided with a central slot 44 which extends inwardly from the free end thereof into the connecting portion so as to divide the respective nail shank engaging portions into a pair of spaced spring fingers. Also, as before, the connecting portion 42 is formed with a pair of slots 46 extending inwardly from opposite edges thereof in perpendicular relation with the slots 44 so as to form fracturable neck portions 48 similar to the neck portions 34 previously described.

It will be noted that the connector elements 36 provide sections which extend across the leading surface of the trailing nail of the nail package 10 and the trailing surface of the leading nail of the nail package 12 when disposed in operative gripped engagement therewith, which, as previously described, minimizes the tendency for the spring fingers to flex into an open position and release the nail shanks during feeding movements. The fracturing capabilities of the connector elements 36 are similar to those of the connector elements 14 previously described.

With the correspondingly positioned nail shank engaging portions 38 and 40, the connector elements 36 can be moved into engaged position by a single lateral movement with respect to the nail shanks without the necessity of any movement of the nails. This arrangement provides for a somewhat more convenient engagement than is the case with the connector element 14 which requires a transverse movement of the nails with respect to each other in order to effect engagement. While it is contemplated that a pair of connectors could be engaged with the trailing nail of each nail package, the more practical operation would involve the supply of connector elements in bulk for movement into gripping engagement by the operator as the occasion requires.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

I claim:

1. A device for use in connecting the trailing nail of a first group of nails interconnected in series in parallel relation by flexible elongated means secured across the shanks thereof with the leading nail of a second group of nails similarly interconnected comprising a one-piece element made of thin resilient material shaped to provide spaced trailing and leading nail shank engaging portions integrally interconnected by a central connecting portion, each of said nail shank engaging portions being of generally C-shaped configuration operable to resiliently grip a nail shank around a substantial portion of the periphery thereof in response to a relative transverse movement of a nail from a disengaged position outwardly thereof to an engaged position therein, each of said nail shank engaging portions defining an opening of a size less than the diameter of the nail shank when the latter is in a disengaged or engaged position with respect thereto and being sufficiently resilient to flex outwardly in response to the movement of a nail from said disengaged position to said engaged position to expand the opening to said diameter size and permit passage of the nail thereby, said connecting portion having a longitudinal extent such that when the aforesaid trailing and leading nails are disposed in engaged positions within said trailing and leading nail shank engaging portions respectively the trailing and leading nails are spaced apart a distance equal to their spacing with respect to the adjacent nail of their respective groups and being constructed to transmit transverse feeding movements of the trailing nail to the leading nail and to provide for the fracture and separation of the trailing nail shank engaging portion from the leading nail shank engaging portion in response to a rapid relation longitudinal movement of the trailing nail with respect to the leading nail.

2. A device as defined in claim 1 wherein said trailing nail shank engaging portion includes a section extending around the leading surface of the trailing nail and said leading nail shank engaging portion includes a section extending around the trailing surface of the leading nail when said trailing and leading nails are disposed in said engaged positions.

3. A device as defined in claim 2 wherein said trailing nail shank engaging portion is oriented in reverse relation with respect to the leading nail shank portion so that engaging portion openings thereof are disposed in opposed relation with said connecting portion extending diagonally therebetween.

4. A device as defined in claim 2 wherein said trailing nail shank engaging portion is oriented in the same relation with respect to the leading nail shank engaging portion so that the openings thereof extend laterally in the same direction and said connecting portion extends longitudinally therebetween.

5. A device as defined in claim 2 wherein each of said nail shank engaging portions is in the form of a pair of spring fingers spaced apart by a central slot extending from the free end thereof inwardly into said connecting portion for receiving the flexible elongated means in the form of a wire welded to the respective nail shanks when disposed in said engaged position.

6. A device as defined in claim 5 wherein said connecting portion includes a pair of aligned spaced slots extending inwardly from opposed edges thereof in perpendicular relation to said first-mentioned slots, the connecting portion providing a fracturable narrow neck for each spring finger between the slots associated therewith.

* * * * *